US005254403A

United States Patent [19]

Malhotra

[11] Patent Number: 5,254,403

[45] Date of Patent: Oct. 19, 1993

[54] COATED RECORDING SHEETS

[75] Inventor: Shadi L. Malhotra, Mississauga, Canada

[73] Assignee: Xerox Corporation, Stamford, Conn.

[21] Appl. No.: 872,373

[22] Filed: Apr. 23, 1992

[51] Int. Cl.$^5$ .................... B41M 5/00; B32B 27/08

[52] U.S. Cl. .................... 428/323; 428/336; 428/483; 428/508; 428/509; 428/523; 427/261

[58] Field of Search .................... 428/336, 483, 523, 323, 428/508, 509

[56] References Cited

U.S. PATENT DOCUMENTS

| | | | |
|---|---|---|---|
| 4,371,582 | 2/1983 | Sugiyama et al. | 428/341 |
| 4,528,242 | 7/1985 | Burwasser | 428/413 |
| 4,547,405 | 10/1985 | Bedell et al. | 427/256 |
| 4,555,437 | 11/1985 | Tanck | 428/212 |
| 4,575,465 | 3/1986 | Viola | 427/261 |
| 4,578,285 | 3/1986 | Viola | 427/209 |
| 4,592,954 | 6/1986 | Malhotra | 428/335 |
| 4,865,914 | 9/1989 | Malhotra | 428/331 |
| 4,946,741 | 8/1990 | Aono et al. | 428/336 |
| 4,997,697 | 3/1991 | Malhortra | 428/195 |
| 5,006,407 | 4/1991 | Malhortra | 428/336 |
| 5,075,153 | 12/1991 | Malhotra | 428/207 |

*Primary Examiner*—P. C. Sluby
*Attorney, Agent, or Firm*—Judith L. Byorick

[57] ABSTRACT

Disclosed is a recording sheet which comprises a substrate and an image receiving layer comprising a mixture of (a) a polymer capable of forming a latex and selected from the group consisting of poly (vinyl chloride), ethylene-vinyl chloride copolymers, poly (vinyl acetate), carboxylated poly (vinyl acetate), ethylene-vinyl acetate copolymers, polymers containing acrylate monomers, poly styrene, styrene-butadiene copolymers, carboxylated styrene-butadiene copolymers, butadiene-acrylonitrile copolymers, butadiene-acrylonitrile-styrene copolymers, and mixtures thereof; (b) a polysaccharide; and (c) a polymer containing oxyalkylene monomers.

8 Claims, No Drawings

COATED RECORDING SHEETS

BACKGROUND OF THE INVENTION

The present invention is directed to recording sheets suitable for use in copying and printing applications. More specifically, the present invention is directed to recording sheets suitable for use in both ink jet and electrophotographic imaging processes. One embodiment of the present invention is directed to a recording sheet which comprises a substrate and an image receiving layer comprising a mixture of (a) a polymer capable of forming a latex and selected from the group consisting of poly (vinyl chloride), ethylene-vinyl chloride copolymers, poly (vinyl acetate), carboxylated poly (vinyl acetate), ethylene-vinyl acetate copolymers, polymers containing acrylate monomers, poly styrene, styrene-butadiene copolymers, carboxylated styrene-butadiene copolymers, butadiene-acrylonitrile copolymers, butadiene-acrylonitrile-styrene copolymers, and mixtures thereof; (b) a polysaccharide; and (c) a polymer containing oxyalkylene monomers.

Recording sheets suitable for various printing and imaging processes are known. For example, U.S. Pat. No. 4,371,582 (Sugiyama et al.) discloses an ink jet recording sheet containing a basic latex represented by the formula $$-(A)_x-(B)_y-(C)_z-$$

wherein $-(A)-$ represents a polymeric unit formed by copolymerizing a copolymerizable monomer containing a tert-amino group or a quaternary ammonium group, $-(B)-$ represents a polymeric unit formed by copolymerizing a compolymerizable monomer containing at least two ethylenically unsaturated groups, $-(C)-$ represents a polymeric unit formed by copolymerizing copolymerizable ethylenically unsaturated monomers other than those used for forming $-(A)-$ and $-(B)-$, x represents from 10 to 99 mole percent, y represents from 0 to 10 mole percent, and z represents from 0 to 90 mole percent.

U.S. Pat. No. 4,528,242 (Burwasser) discloses an ink jet recording transparency capable of absorbing colored, aqueous-miscible inks to provide permanent smear-resistant images. The transparency includes a transparent resinous support and a coating which is clear and comprises a mixture of a carboxylated polymer or copolymer having a molecular weight of about 50,000 to 1 million, and a polyalkylene glycol having an average molecular weight of about 5,000 to 25,000, with the glycol being present in an amount of about 5 to about 70 percent of the polymer.

U.S. Pat. No. 4,547,405 (Bedell et al.), the disclosure of which is totally incorporated herein by reference, discloses an ink jet recording sheet comprising a transparent support carrying a layer comprising 5 to 100 percent by weight of a coalesced block copolymer latex of poly(vinyl alcohol) with polyvinyl (benzyl ammonium chloride) and 0 to 95 percent by weight of a water soluble polymer selected from the group consisting of poly(vinyl alcohol), poly(vinyl pyrrolidone), and copolymers thereof.

U.S. Pat. No. 4,555,437 (Tanck) discloses a transparent recording medium which comprises a conventional transparency base material coated with hydroxyethyl cellulose and optionally containing one or more additional polymers compatible therewith.

U.S. Pat. No. 4,575,465 (Viola) discloses an ink jet recording sheet comprising a transparent support carrying a layer comprising up to 50 percent by weight of vinylpyridine/vinylbenzyl quaternary salt copolymer and a hydrophilic polymer selected from the group consisting of gelatin, polyvinyl alcohol, hydroxypropyl cellulose, and mixtures thereof.

U.S. Pat. No. 4,578,285 (Viola) discloses a printing substrate adapted to receive ink droplets to form an image generated by an ink jet printer which comprises a transparent support carrying a layer comprising at least 70 percent by weight polyurethane and 5 to 30 percent by weight of a polymer selected from the group consisting of poly(vinyl pyrrolidone), polyvinylpyrrolidone/vinyl acetate copolymer, poly(ethylene oxide), gelatin, and poly(acrylic acid).

U.S. Pat. No. 4,592,954 (Malhotra), the disclosure of which is totally incorporated herein by reference, discloses a transparency for ink jet printing which comprises a supporting substrate and thereover a coating consisting essentially of a blend of carboxymethyl cellulose and poly(ethylene oxides). This patent also discloses papers for use in ink jet printing which comprise a plain paper substrate and a coating thereover consisting essentially of polyethylene oxides.

U.S. Pat. No. 4,946,741 (Aono et al.) discloses an ink recording sheet comprising a transparent support having thereon an ink recording layer comprising a mixture of an amino-deactivated gelatin derivative and a poly alkylene oxide.

U.S. Pat. No. 4,865,914 (Malhotra), the disclosure of which is totally incorporated herein by reference, discloses a transparency which comprises a supporting substrate and a blend which comprises polyethylene oxide and carboxymethyl cellulose together with a component selected from the group consisting of (1) hydroxypropyl cellulose; (2) vinylmethyl ether/maleic acid copolymer; (3) carboxymethyl hydroxyethyl cellulose; (4) hydroxyethyl cellulose; (5) acrylamide/acrylic acid copolymer; (6) cellulose sulfate; (7) poly(2-acrylamido-2-methyl propane sulfonic acid); (8) poly(-vinyl alcohol); (9) poly(vinyl pyrrolidone); and (10) hydroxypropyl methyl cellulose. Papers with these coatings are also disclosed.

U.S. Pat. No. 5,006,407 (Malhotra), the disclosures of which is totally incorporated herein by reference, discloses a transparent substrate material for receiving or containing an image which comprises a supporting substrate and a coating with a plasticizer such as a phosphate, a substituted phthalic anhydride, a glycerol, a glycol, a substituted glycerol, a pyrrolidinone, an alkylene carbonate, a sulfolane, or a steric acid derivative. Papers having the disclosed coatings are also included in the disclosure.

U.S. Pat. No. 4,997,697 (Malhotra), the disclosure of which is totally incorporated herein by reference, discloses a transparent substrate material for receiving or containing an image which comprises a supporting substrate base, an antistatic polymer layer coated on one or both sides of the substrate and comprising hydrophilic cellulosic components, and a toner receiving polymer layer contained on one or both sides of the antistatic layer, which polymer comprises hydrophobic cellulose ethers, hydrophobic cellulose esters, or mixtures thereof, and wherein the toner receiving layer contains adhesive components.

U.S. Pat. No. 5,075,153 (Malhotra), the disclosure of which is totally incorporated herein by reference, discloses a never-tear coated paper comprising a plastic supporting substrate; a binder layer comprising polymers selected from the group consisting of (1) hydroxypropyl cellulose, (2) poly(vinyl alkyl ether), (3) vinyl pyrrolidone-vinyl acetate copolymer, (4) vinyl pyrrolidone-dialkylamino ethyl methacrylate copolymer quaternized, (5) poly(vinyl pyrrolidone), (6) poly(ethylene imine), and mixtures thereof; a pigment or pigments; and an ink receiving polymer layer.

Copending application U.S. Ser. No. 07/370,677 (Malhotra), now U.S. Pat. No. 5,139,903 the disclosure of which is totally incorporated herein by reference, discloses an imaged transparency comprising a supporting substrate, an oil absorbing layer which comprises, for example, chlorinated rubber, styrene-olefin copolymers, alkylmethacrylate copolymers, ethylene-propylene copolymers, sodium carboxymethyl cellulose or sodium carboxymethylhydroxyethyl cellulose, and ink receiving polymer layers comprising, for example, vinyl alcohol-vinyl acetate, vinyl alcohol-vinyl butyral, or vinyl alcohol-vinyl acetate-vinyl chloride copolymers. The ink receiving layers may include therein or thereon fillers such as silica, calcium carbonate, or titanium dioxide.

Copending application U.S. Ser. No. 07/587,781 (Malhotra), now U.S. Pat. No. 5,137,773 the disclosure of which is totally incorporated herein by reference, discloses transparencies comprising a supporting substrate and a coating composition thereon which comprises a mixture of (a) nonionic celluloses; (b) ionic celluloses; and (c) poly(alkylene oxide) together with a noncellulosic component selected from the group consisting of (1) poly(imidazoline) quaternized; (2) poly(N,N-dialkyl dialkylene piperidinium halide); (3) poly(acrylamido-2-alkyl propane sulfonic acid); (4) poly(ethylene imine) epihalohydrin; (5) poly(acrylamide); (6) acrylamide-acrylic acid copolymer; (7) poly(-vinyl pyrrolidone); (8) poly(vinyl alcohol); (9) vinyl pyrrolidone-dialkyl aminomethylmethacrylate copolymer quaternized; (10) vinyl pyrrolidone-vinyl acetate copolymer; and mixtures thereof.

Copending application U.S. Ser. No. 07/561,430 (Malhotra), pending filed Aug. 1, 1990, the disclosure of which is totally incorporated herein by reference, discloses a recording sheet which comprises, in the order stated, an ink receiving layer, a base sheet, a heat absorbing layer, and an anticurl layer. The recording sheet can be transparent or opaque, and can be used in a wide variety of printing and imaging processes. The recording sheet exhibits little or no curling, even after exposure to heat and/or a wide range of relative humidities.

Copending application U.S. Ser. No. 07/861,668 (Malhotra et al.), now U.S. Pat. No. 5,212,008, the disclosure of which is totally incorporated herein by reference, discloses a recording sheet which comprises a substrate; a first coating in contact with the substrate which comprises a crosslinking agent selected from the group consisting of hexamethoxymethyl melamine, methylated melamine-formaldehyde, methylated urea-formaldehyde, cationic urea-formaldehyde, cationic polyamine-epichlorohydrin, glyoxal-urea resin, poly (azirrdine), poly (acrylamide), poly (N,N-dimethyl acrylamide), acrylamide-acrylic acid copolymer, poly (2-acrylamido-2-methyl propane sulfonic acid), poly (N,N-dimethyl-3,5-dimethylene piperidinium chloride), poly (methylene-guanidine) hydrochloride, poly (ethylene imine) poly (ethylene imine) epichlorohydrin, poly (ethylene imine) ethoxylated, glutaraldehyde, and mixtures thereof; a catalyst; and a polymeric material capable of being crosslinked by the crosslinking agent and selected from the group consisting of polysaccharides having at least one hydroxy group, polysaccharides having at least one carboxy group, polysaccharides having at least one sulfate group, polysaccharides having at least one amine or amino group, polysaccharide gums, poly (alkylene oxides), vinyl polymers, and mixtures thereof; and a second coating in contact with the first coating which comprises a binder and a material selected from the group consisting of fatty imidazolines, ethosulfate quaternary compounds, dialkyl dimethyl methosulfate quaternary compounds, alkoxylated difatty quaternary compounds, amine oxides, amine ethoxylates, imidazoline quaternary compounds, alkyl benzyl dimethyl quaternary compounds, poly (epiamines), and mixtures thereof.

While known compositions and processes are suitable for their intended purposes, a need remains for improved recording sheets. In addition, there is a need for improved recording sheets suitable for use in ink jet printing processes. Further, a need remains for improved recording sheets suitable for use in printing and copying processes employing electrophotographic-type developers. Additionally, a need exists for recording sheets that enable the formation of images with high optical density. There is also a need for recording sheets that enable the formation of high quality color images with minimum intercolor bleed. In addition, there is a need for recording sheets that exhibit minimum intercolor bleed of color images when the imaged sheets are stored in folders or plastic sleeves. Further, a need remains for recording sheets that exhibit excellent heat and/or humidity resistance. Additionally, there is a need for recording sheets that exhibit minimum blocking (sticking together) at high relative humidities of, for example, 50 to 80 percent and at relatively high temperatures of, for example, over 80° F.

SUMMARY OF THE INVENTION

It is an object of the present invention to provide recording sheets with the above noted advantages.

It is another object of the present invention to provide recording sheets suitable for use in ink jet printing processes.

It is yet another object of the present invention to provide recording sheets suitable for use in printing and copying processes employing electrophotographic-type developers.

It is still another object of the present invention to provide recording sheets that enable the formation of images with high optical density.

Another object of the present invention is to provide recording sheets that enable the formation of high quality color images with minimum intercolor bleed.

Yet another object of the present invention is to provide recording sheets that exhibit minimum intercolor bleed of color images when the imaged sheets are stored in folders or plastic sleeves.

Still another object of the present invention is to provide recording sheets that exhibit excellent heat and/or humidity resistance.

It is another object of the present invention to provide recording sheets that exhibit minimum blocking (sticking together) at high relative humidities of, for example, 50 to 80 percent and at relatively high temperatures of, for example, over 50° C.

These and other objects of the present invention (or specific embodiments thereof) can be achieved by providing a recording sheet which comprises a substrate and an image receiving layer comprising a mixture of (a) a polymer capable of forming a latex and selected from the group consisting of poly (vinyl chloride), ethylene-vinyl chloride copolymers, poly (vinyl acetate), carboxylated poly (vinyl acetate), ethylene-vinyl acetate copolymers, polymers containing acrylate monomers, poly styrene, styrene-butadiene copolymers, carboxylated styrene-butadiene copolymers, butadiene-acrylonitrile copolymers, butadiene-acrylonitrile-styrene copolymers, and mixtures thereof; (b) a polysaccharide; and (c) a polymer containing oxyalkylene monomers. These recording sheets exhibit many advantages, such as high optical density of images generated thereon, minimum intercolor bleed in imaged areas, minimum undesirable mildew in the transparency coatings when the recording sheets are kept in plastic commercially available folders or plastic sleeves such as those fabricated with poly (propylene), poly (vinyl chloride), and poly (esters), and other advantages as set forth herein.

DETAILED DESCRIPTION OF THE INVENTION

The recording sheets of the present invention comprise a substrate and an image receiving coating layer on one or both surfaces of the substrate. Any suitable substrate can be employed. Examples include transparent materials, such as polyester, including Mylar TM, available from E. I. Du Pont de Nemours & Company, Melinex TM, available from Imperial Chemicals, Inc., Celanar TM, available from Celanese Corporation, polycarbonates such as Lexan TM, available from General Electric Company, polysulfones, such as those available from Union Carbide Corporation, polyether sulfones, such as those prepared from 4,4'-diphenyl ether, such as Udel TM, available from Union Carbide Corporation, those prepared from disulfonyl chloride, such as Victrex TM, available from ICI America Incorporated, those prepared from biphenylene, such as Astrel TM, available from 3M Company, poly (arylene sulfones), such as those prepared from crosslinked poly-(arylene ether ketone sulfones), cellulose triacetate, polyvinylchloride cellophane, polyvinyl fluoride, polyimides, and the like, with polyester such as Mylar TM being preferred in view of its availability and relatively low cost. The substrate can also be opaque, including opaque plastics, such as Teslin TM, available from PPG Industries, and filled polymers, such as Melinex®, available from ICI. Other substrates, such as paper, can also be used if desired, although transparency materials and opaque plastics are preferred. The substrate can be of any effective thickness. Typical thicknesses for the substrate are from about 50 to about 250 microns, and preferably from about 100 to about 125 microns, although the thickness can be outside of these ranges.

The substrate is coated, either on on surface or on both surfaces, with an image receiving layer. The image receiving layer comprises a mixture of (a) a polymer or mixture of polymers capable of forming a latex; (b) a polysaccharide or mixture of polysaccharides; and (c) a polymer or mixture of polymers containing oxyalkylene monomers. This image receiving layer is of any effective thickness. Typically the thickness is from about 1 to about 25 microns, and preferably from about 5 to about 15 microns, although the thickness can be outside these ranges. The components of the image receiving layer are present in any effective relative amounts. Typically, the latex polymer is present in an amount of from about 5 to about 95 percent by weight, the polysaccharide is present in an amount of from about 2 to about 60 percent by weight, and the oxyalkylene-containing polymer is present in an amount of from about 3 to about 60 percent by weight, and preferably the latex polymer is present in an amount of from about 10 to about 50 percent by weight, the polysaccharide is present in an amount of from about 10 to about 50 percent by weight, and the oxyalkylene-containing polymer is present in an amount of from about 10 to about 50 percent by weight, although the relative amounts can be outside these ranges.

The polymer capable of forming a latex is, for the purposes of the present invention, a polymer that forms in water or in an organic solvent a stable colloidal system in which the disperse phase is polymeric. Examples of suitable latex-forming polymers include vinyl chloride latex, such as Geon 352 from B. F. Goodrich Chemical Group, ethylene-vinyl chloride copolymer emulsions, such as Airflex ethylene-vinyl chloride from Air Products and Chemicals, poly vinyl acetate homopolymer emulsions, such as Vinac from Air Products and Chemicals, carboxylated vinyl acetate emulsion resins, such as Synthemul synthetic resin emulsions 40-502, 40-503, and 97-664 from Reichhold Chemicals Inc. and Polyco 2149, 2150, and 2171, from Rohm and Haas Co., vinyl acetate copolymer latex, such as 76 RES 7800 from Union Oil Chemicals Divisions and Resyn 25-1103, Resyn 25-1109, Resyn 25-1119, and Resyn 25-1189 from National Starch and Chemical Corporation, ethylene-vinyl acetate copolymer emulsions, such as Airflex ethylene-vinylacetate from Air Products and Chemicals Inc., acrylic-vinyl acetate copolymer emulsions, such as Rhoplex AR-74 from Rohm and Haas Co, Synthemul 97-726 from Reichhold Chemicals Inc., Resyn 25-1140, 25-1141, 25-1142, and Resyn-6820 from National Starch and Chemical Corporation, vinyl acrylic terpolymer latex, such as 76 RES 3103 from Union Oil Chemical Division and Resyn 25-1110 from National Starch and Chemical Corporation, acrylic emulsion latex, such as Rhoplex B-15J, Rhoplex P-376, Rhoplex TR-407, Rhoplex E-940, Rhoplex TR-934, Rhoplex TR-520, Rhoplex HA-24, and Rhoplex NW-1825 from Rohm and Haas company and Hycar 2600 X 322, Hycar 2671, Hycar 2679, Hycar 26120, and Hycar 2600 X347 from B. F. Goodrich Chemical Group, polystyrene latex, such as DL6622A, DL6688A, and DL6687A from Dow Chemical Company, styrene-butadiene latexes, such as 76 RES 4100 and 76 RES 8100 available from Union Oil Chemicals Division, Tylac resin emulsion 68-412, Tylac resin emulsion 68-067, 68-319, 68-413, 68-500, 68-501, available from Reichhold Chemical Inc., and DL6672A, DL6663A, DL6638A, DL6626A, DL6620A, DL615A, DL617A, DL620A, DL640A, DL650A From Dow Chemical Company, butadiene-acrylonitrile latex, such as Hycar 1561 and Hycar 1562 from B. F. Goodrich Chemical Group and Tylac Synthetic Rubber Latex 68-302 from Reichhold Chemicals Inc., butadiene-acrylonitrile-styrene terpolymer latex, such as Tylac synthetic rubber latex 68-513 from Reichhold Chemicals Inc., and the like, as well as mixtures thereof.

Examples of suitable polysaccharides include (1) cellulose ester salts, such as sodium derivatives of cellulose phosphate ester (including those available from James River Chemicals), cellulose phosphate, available from CTC organics, sodium cellulose sulfate, available from Janssen Chimica, cellulose carbonate, available from Sigma Chemicals, sodium ethyl cellulose (which can be obtained by the reaction of alkali cellulose with sodium chloroethane sulfonate), and the like; (2) cellulose ethers and their salts, such as sodium carboxymethylcellulose (including CMC 7HOF, available from Hercules Chemicals Company), sodium carboxymethylhydroxyethyl cellulose (including CMHEC 43H TM and 37L, available from Hercules Chemical Company; CMHEC 43H TM is believed to be a high molecular weight polymer with carboxymethyl cellulose (CMC)/hydroxyethyl cellulose (HEC) ratio of 4:3, and CMHEC 37L is believed to be of lower molecular weight with a CMC/HEC ratio of 3:7), carboxymethylmethyl cellulose, available from Aqualon Company, carboxymethyl cellulose calcium salt, available from Pfaltz and Bauer Inc., carboxymethyl cellulose ether sodium salt, available from E. M. Science Company, carboxymethyl cellulose hydrazide, available from Sigma Chemicals, sodium sulfoethyl cellulose (which can be prepared by the reaction of sodium vinyl sulfonate with alkali cellulose), and the like; (3) cationic cellulose ethers, such as diethyl aminoethyl cellulose (including DEAE cellulose, available from Poly Sciences Inc.), cationic hydroxyethyl celluloses, such as diethyl ammonium chloride hydroxyethylcellulose and hydroxypropyl triethyl ammonium chloride hydroxyethylcellulose (available as Celquat H-100 and L-200 from National Starch and Chemical Company and as Polymer JR series from Union Carbide Company), and the like; (4) hydroxyalkyl celluloses, such as hydroxyethyl cellulose (Including Natrosol 250 LR, available from Hercules Chemical Company), hydroxypropyl methyl cellulose, such as Methocel TM K35LV, available from Dow Chemical Company, hydroxypropyl hydroxyethyl cellulose, available from Aqualon Company, dihydroxypropyl cellulose (which can be prepared by the reaction of 3-chloro-1,2-propane diol with alkali cellulose), and the like; (5) substituted deoxycelluloses, such as chlorodeoxycellulose (which can be prepared by the reaction of cellulose with sulfuryl chloride in pyridine and $CHCL_3$ at 25° C.), amino deoxycellulose (which can be prepared by the reaction of chlorodeoxycellulose with 19 percent alcoholic solution of ammonia for 6 hours at 160° C.), deoxycellulose phosphate (which can be prepared by the reaction of tosyl cellulose with triethyl phosphate in dimethyl formamide at 85° C.), deoxy cellulose phosphonium salt (which can be prepared by the reaction of tosyl cellulose with tris(hydroxy methyl) phosphine), and the like; (6) dextran polymers, such as carboxymethyl dextran (including #16058, available from Poly Sciences Inc.), diethyl aminoethyl dextran, such as #5178, available from Poly Sciences Inc., dextran sulfate, available from Sigma Chemical Company, dextran sulfate potassium salt, available from Calibiochem Corporation, dextran sulfate sodium salt, available from Poly Sciences Inc., amino dextran, available from Molecular Probes Inc., dextran polysulfonate sodium salt, available from Research Plus Inc., and the like; (7) natural ionic gums and their modifications, such as alginic acid sodium salt (including #032, available from Scientific Polymer Products), alginic acid ammonium salt, available from Fluka Chemie AG, alginic acid calcium salt, available from Fluka Chemie AG, alginic acid calcium sodium salt, available from American Tokyo Kasel Inc., gum arabic, available from Sigma Chemicals, Carrageenan sodium salt, available from Gallard-Schless Inc., carboxymethyl hydroxypropyl guar, available from Aqualon Company, cationic gum guar, available as Celanese Jaguars C-14-S, C-15, and C-17 from Celanese Chemical Company; karaya gum, available from Sigma Chemicals, xanthan gum, availble as Keltrol-T from Kelco divsion of Merck and Company, chitosan, available from Fluka Chemie AG, n-carboxymethyl chitin, and the like; (8) protein polymers, such as dimethylammonium hydrolyzed collagen protein, available as Croquats from Croda, agar-agar, available from Pfaltz and Bauer Inc., amino agarose, available from Accurate Chemical and Scientific Corporation, and the like; (9) n-carboxymethyl amylose sodium salt, available from Sigma Chemicals; and the like, as well as mixtures thereof.

Examples of suitable polymers containing oxyalkylene units include poly (oxy methylene), such as #009, available from Scientific Polymer Products, poly(oxyethylene) or poly(ethylene oxide), such as POLY OX WSRN-3000, available from Union Carbide Corporation, poly (propylene oxide), such as #822, available from Scientific Polymer Products, poly (1,4-oxybutylene) glycol, such as #757, #758, #693, #694, available from Scientific Polymer Products, ethylene oxide/propylene oxide copolymers, such as ethylene oxide/propylene oxide/ethylene oxide triblock copolymer, such as Alkatronic EGE-31-1, available from Alkaril Chemicals, propylene oxide/ethylene oxide/propylene oxide triblock copolymers, such as Alkatronic PGP 3B-1, available from Alkaril Chemicals, tetrafunctional block copolymers derived from the sequential addition of ethylene oxide and propylene oxide to ethylene diamine, the content of ethylene oxide in these block copolymers being from about 5 to about 95 percent by weight, such as Tetronic 50R8, available from BASF Corporation, ethylene oxide/2-hdyroxyethyl methacrylate/ethylene oxide and ethylene oxide/hydroxypropyl methacrylate/ethylene oxide triblock copolymers, which can be synthesized via free radical polymerization of hydroxyethyl methacrylate or hydroxypropyl methacrylate with 2-aminoethanethiol using $\alpha,\alpha'$ azobisisobutyronitrile as initiator and reacting the resulting amino-semitelechelic oligo-hydroxyethyl methacrylate or amino-hydroxpropyl methacrylate with an isocyanate-polyethylene oxide complex in chlorobenzene at 0° C., and precipitating the reaction mixture in diethylether, filtering and drying in vacuum, ethylene oxide/4-vinyl pyridine/ethylene oxide triblock copolymers, which can be synthesized via anionic polymerization of 4-vinyl pyridine with sodium napthalene as initiator at −78° C. and then adding ethylene oxide monomer, the reaction being carried out in an explosion proof stainless steel reactor, ionene/ethylene oxide/ionene triblock copolymers, which can be synthesized via quaternization reaction of one end of each 3-3 ionene with the halogenated (preferably brominated) poly(oxyethylene) in methanol at about 40° C., ethylene oxide/isoprene/ethylene oxide triblock copolymers, which can be synthesized via anionic polymerization of isoprene with sodium naphthalene in tetrahydrofuran as solvent at −78° C. and then adding monomer ethylene oxide and polymerizing the reaction for three days, after which time the reaction is quenched with methanol, the ethylene oxide content in the aforementioned triblock copolymers being from about 20 to about 70 percent by weight and preferably about 50 percent by weight, and the like, as well as mixtures thereof. The preferred oxyalkylene containing polymers are poly (ethylene oxide), poly (propylene oxide), and ethylene oxide/propylene oxide block copolymers because of their availability and lower cost.

Specific examples of the image receiving layer compositions suitable for the recording sheets of the present invention include blends of 20 percent by weight of vinyl chloride latex (such as Geon 352, available from B. F. Goodrich Company) or ethylene-vinyl chloride copolymer latex (such as Airflex ethylene-vinyl chloride, available from Air Products and Chemicals), 40 percent by weight of a cellulose ester salt, such as sodium derivatives of cellulose phosphate ester (including those available from James River Chemicals) or cellulose phosphate (available from CTC organics) or sodium cellulose sulfate (available from Janssen Chimica) or cellulose carbonate (available from Sigma Chemicals) or sodium ethyl cellulose (which can be obtained by the reaction of alkali cellulose with sodium chloroethane sulfonate), and 40 percent by weight of poly (propylene oxide) (such as #822, available from Scientific Polymer Products); blends of 20 percent by weight of poly (vinyl acetate) homopolymer latex (such as Vinac, available from Air Products and Chemicals) or a carboxylated vinyl acetate homopolymer latex (such as Synthemul synthetic resin 40-502 or Synthemul synthetic resin 97-664, available from Reichhold Chemicals Inc. or Polyco 2149, Polyco 2150, or Polyco 2171, available from Rohm and Haas Co.), 40 percent by weight of a dextran polymer, such as carboxymethyl dextran (including #16058, available from Poly Sciences Inc.) or diethyl aminoethyl dextran (such as #5178, available from Poly Sciences) or dextran sulfate (available from Sigma Chemical Company) or dextran sulfate potassium salt (available from Calibiochem Corporation) or dextran sulfate sodium salt (available from Poly Sciences Inc.) or dextran polysulfonate sodium salt (available from Research Plus Inc.), and 40 percent by weight of an ethylene oxide/propylene oxide block copolymer (such as Tetronic 50R8, available from BASF Corporation) or ethylene oxide/propylene oxide/ethylene oxide triblock copolymer (such as Alkatronic EGE 31-1, available from Alkaril Chemicals) or propylene oxide/ethylene oxide/propylene oxide triblock copolymer (such as Alkatronic PGP 33-1, available from Alkaril Chemicals) or poly (1,4-oxybutylene) glycol (such as #757, #758, #693, #694, available from Scientific Polymer Products); blends of 25 percent by weight of an acrylic emulsion latex (such as Rhoplex B-15J, Rhoplex P-376, Rhoplex TR-407, Rhoplex E-940, Rhoplex TR-934, Rhoplex TR-520, Rhoplex HA-24, Rhoplex NW-1825, from Rohm and Haas Company, and Hycar 2600 X 322, Hycar 2671, Hycar 2679, Hycar 26120, Hycar 2600 X347 from B. F. Goodrich Chemical Group), 25 percent by weight of a cellulose ether or its salt, such as sodium carboxymethylcellulose (including CMC 7HOF, available from Hercules Chemicals Company) or sodium carboxymethylhydroxyethyl cellulose (including CMHEC 43H TM and 37L, available from Hercules Chemical Company; CMHEC 43H TM is believed to be a high molecular weight polymer with carboxymethyl cellulose (CMC)/hydroxyethyl cellulose (HEC) ratio of 4:3, and CMHEC 37L is believed to be of lower molecular weight with a CMC/HEC ratio of 3:7) or carboxymethylmethyl cellulose (available from Aqualon Company) or a carboxymethyl cellulose calcium salt (available from Pfaltz and Bauer Inc.) or carboxymethyl cellulose ether sodium salt (available from E. M. Science Company) or carboxymethyl cellulose hydrazide (available from Sigma Chemicals) or sodium sulfoethyl cellulose (which can be prepared by the reaction of sodium vinyl sulfonate with alkali cellulose), and 50 percent by weight of poly (ethylene oxide) (such as POLY OX WSRN-3000, available from Union Carbide); blends of 25 percent by weight of a styrene-butadiene latex (such as 76 RES 4100, 76 RES 8100, available from Union Oil Chemicals Division, Tylac resin emulsion 68-412, Tylac resin emulsion 68-067, 68-319, 68-413, 68-500, 68-501, available from Reichhold Chemical Inc, DL 6672A, DL 6663A, DL 6638A, DL 6626A, DL 6620A, DL 615 A, DL 617 A, DL 620 A, DL 640 A, DL 650 A, available from DOW Chemical Company), 25 percent by weight of sodium carboxy methyl cellulose (such as CMC 7HOF, available from Hercules Chemical Company) or a hydroxyalkyl cellulose, such as hydroxyethyl cellulose (including Natrosol 250 LR, available from Hercules Chemical Company) or hydroxypropyl methyl cellulose (such as Methocel TM K35LV, available from Dow Chemical Company) or hydroxypropyl hydroxyethyl cellulose (available from Aqualon Company) or dihydroxypropyl cellulose (which can be prepared by the reaction of 3-chloro-1,2-propanediol with alkali cellulose), and 50 percent by weight of poly (ethylene oxide) (such as POLY OX WSRN-3000, available from Union Carbide) or poly (oxy methylene) (such as #009, available from Scientific Polymer Products) or ethylene oxide/isoprene/ethylene oxide triblock copolymer or ethylene oxide/4-vinyl pyridine/ethylene oxide triblock copolymer; blends of 25 percent by weight of an acrylic-vinyl acetate copolymer emulsion (such as Rhoplex AR-74, available from Rohm and Haas Co., Synthemul 97-726, available from Reichhold Chemicals Inc., Resyn 25-1140, 25-1141, 25-1142, Resyn-6820 available from National Starch and Chemical Corporation), 25 percent by weight of natural ionic gums and their modifications, such as alginic acid sodium salt (including #032, available from Scientific Polymer Products) or alginic acid ammonium salt (available from Fluka Chemie AG) or alginic acid calcium salt (available from Fluka Chemie AG) or alginic acid calcium sodium salt (available from American Tokyo Kasel Inc.) or gum arabic (available from Sigma Chemicals) or carrageenan sodium salt (available from Gallard-Schless Inc.) or carboxymethyl hydroxypropyl guar (available from Aqualon Company) or cationic gum guar (available as Celanese Jaguars C-14-S, C-15, and C-17 from Celanese Chemical Company) or karaya gum (available from Sigma Chemicals) or xanthan gum (available as Keltrol-T from Kelco division of Merck and Company) or chitosan (available from Fluka Chemie AG) or n-carboxymethyl chitin, and 50 percent by weight of ethylene oxide/hydroxypropyl methacrylate/ethylene oxide triblock copolymer or ethylene oxide/propylene oxide/ethylene oxide triblock copolymer (Alkatronic EGE 31-1, available from Alkaril Chemicals) or propylene oxide/ethylene oxide/propylene oxide triblock copolymer (Alkatronic PGP 33-1, available from Alkaril Chemicals); blends of 20 percent by weight of an ethylene-vinyl acetate copolymer emulsion (available as Airflex, from Air Products and Chemicals Inc.), 40 percent by weight of hydroxypropyl methyl cellulose (such as Melhocel K35LV, available from Dow Chemical Company), 20 percent by weight of poly (ethylene oxide) (such as POLY OX WSRN-3000, available from Union Carbide Corporation), and 20 percent by weight of poly (ethylene oxide) (such as POLY OX WSRN-3000, available from Union Carbide Corporation); 20 percent by weight ofsodium carboxymethyl cellulose CMC 7HOF, obtained from Hercules Chemical Company); blends of 20 percent by weight of vinyl acetate copolymer latex (76 RES 7800, available from Union Oil Chemicals Division, Resyn 25-1103, Resyn 25-1109, Resyn 25-1119, Resyn 25-1189, available from National Starch and Chemical Corporation) or vinyl acrylic terpolymer latex (76 RES 3103, available from Union Oil Chemical Division, Resyn 25-1110 from National Starch and Chemical Corporation), 30 percent by weight of a cationic cellulose ether, such as diethyl aminoethyl cellulose (including DEAE cellulose, available from Poly Sciences Inc.) cationic hydroxyethyl celluloses, such as diethyl ammonium chloride hydroxyethylcellulose and hydroxypropyl triethyl ammonium chloride hydroxyethylcellulose (available as Celquat H-100 and L-200 from National Starch and Chemical Company and as Polymer JR series from Union Carbide Company), and 50 percent by weight of poly (ethylene oxide) (POLY OX WSRN-3000 available from Union Carbide Corporation); blends of 25 percent by weight of butadiene-acrylonitrile latex (Hycar 1561, Hycar 1562, available from B. F. Goodrich Chemical Group, Tylac synthetic rubber latex 68-302, available from Reichhold Chemicals Inc.) or butadiene-acrylonitrile-styrene terpolymer latex (available as Tylac synthetic rubber latex 68-513 available from Reichhold Chemicals Inc.), 25 percent by weight of substituted deoxycelluloses, such as chlorodeoxycellulose (which can be prepared by the reaction of cellulose with sulfuryl chloride in pyridine and $CHCl_3$ at 25° C.) or amino deoxycellulose (which can be prepared by the reaction of chlorodeoxycellulose with 19 percent alcoholic solution of ammonia for 6 hours at 160° C.) or deoxycellulose phosphate (which can be prepared by the reaction of tosyl cellulose with triethyl phosphate in dimethyl formamide at 85° C.) or deoxy cellulose phosphonium salt (which can be prepared by the reaction of tosyl cellulose with tris(hydroxy methyl) phosphine), and 50 percent by weight of poly (oxymethylene) (such as #009, available from Scientific Polymer Products) or poly (1,4-oxybutrylene) glycol (such as #757, #758 available from Scientific Polymer Products) or poly (propylene oxide) (such as #822, available from Scientific Polymer Products); blends of 10 percent by weight of polystyrene latex (DL 6622A, DL 6688 A, DL 6687 available from Dow Chemical Company), 40 percent by weight of protein polymers, such as dimethylammonium hydroxyzed collagen protein (available as Croquats from Croda) or agar-agar (available from Pfaltz and Bauer Inc.) or amino agarose (available from Accurate Chemical and Scientific Corporation) or n-carboxymethyl amylose sodium salt (available from Sigma Chemicals, and the like, as well as mixtures thereof, and 50 percent by weight of poly (ethylene oxide) (POLY OX WSRN-3000, available from Union Carbide); blends of 75 percent by weight of styrene-butadiene latex (such as 76 RES 4100, available from Union Oil Company), 15 percent by weight of polystyrene latex (such as DL 6622 A, available from Dow Chemical Company), 5 percent by weight poly (propylene oxide) (such as #822, available from Scientific Polymer Product), and 5 percent by weight of hydroxyethyl cellulose (such as Natrosol 250 LR, available from Hercules Chemical Company); blends of 90 percent by weight of acrylic-vinyl acetate copolymer latex (such as Rhoplex AR-74, available from Rohm and Haas Co.), 5 percent by weight of sodium carboxymethyl cellulose (such as CMC 7HOF, available from Hercules Chemical Company), and 5 percent by weight of poly (propylene oxide) (such as #822, available from Scientific Polymer Products); blends of acrylic copolymer latexes (such as Rhoplex B-15J, Rhoplex P-376, Rhoplex AR-74, available from Rohm and Haas) with cellulosic polysaccharides, such as sodium carboxymethyl cellulose (such as CMC 7HOF, available from Hercules Chemical Company) and poly (ethylene oxide), as well as blends of styrene-butadiene latexes with sodium carboxymethyl cellulose or hydroxyethyl cellulose or hydroxypropyl methyl cellulose and poly (ethylene oxide) are preferred, as these coatings yield images of high optical density such as 2.32 (black), 1.63 (magenta), 1.95 (cyan), and 1.06 (yellow) in some embodiments with a Xerox 4020 ink jet printer and optical densities of 1.35 (black) with a Xerox 1038 imaging apparatus, which images could not be lifted off with 3M Scotch ® tape 60 seconds subsequent to their preparation.

The image receiving layer can optionally contain filler materials, such as inorganic oxides, including silicon dioxide, titanium dioxide (rutile, available from NL Chem Canada Inc.), and the like, colloidal silicas, such as Syloid TM 74 available from W. R. Grace & Company, calcium arbonate (such as Microwhite available from Sylacauga Calcium Products), calcium silicate (available from J. M. Huber Corporation), or the like, as well as mixtures thereof, in any effective amount. Typical amounts of fillers are from about 1 to about 25 percent by weight of the coating composition, and preferably from about 2 to about 10 percent by weight of the coating composition, although the amount can be outside of these ranges. When it is desired that the recording sheet of the present invention be transparent, the filler typically is present in the coating composition an amount of up to about 3 percent by weight.

The recording sheets of the present invention can be prepared by any suitable method. For example, the image receiving layer coating can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. Once the desired amount of coating has been applied to the web, the coating is dried, typically at from about 25° to about 100° C. in an air drier.

Recording sheets of the present invention can be employed in ink jet printing processes. One embodiment of the present invention is directed to a process which comprises applying an aqueous recording liquid to a recording sheet of the present invention in an imagewise pattern. Another embodiment of the present invention is directed to a printing process which comprises (1) incorporating into an ink jet printing apparatus containing an aqueous ink a recording sheet of the present invention, and (2) causing droplets of the ink to be ejected in an imagewise pattern onto the recording sheet, thereby generating images on the recording sheet. Ink jet printing processes are well known, and are described in, for example, U.S. Pat. Nos. 4,601,777, 4,251,824, 4,410,899, 4,412,224, and U.S. Pat. No. 4,532,530, the disclosures of each of which are totally incorporated herein by reference.

Recording sheets of the present invention can be employed in printing and copying processes wherein dry or liquid electrophotographic-type developers are employed, such as electrophotographic processes, ionographic processes, or the like. Yet another embodiment of the present invention is directed to a process for generating images which comprises generating an electrostatic latent image on an imaging member in an imaging apparatus; developing the latent image with a toner; transferring the developed image to a recording sheet of the present invention; and optionally permanently affixing the transferred image to the recording sheet. Still another embodiment of the present invention is directed to an imaging process which comprises generating an electrostatic latent image on a recording sheet of the present invention; developing the latent image with a toner; and optionally permanently affixing the developed image to the recording sheet. Electrophotographic processes are well known, as described in, for example, U.S. Pat. No. 2,297,691 to Chester Carlson. Ionographic and electrographic processes are also well known, and are described in, for example, U.S. Pat. No. 3,564,556, 3,611,419, 4,240,084, 4,569,584, 2,919,171, 4,524,371, 4,619,515, 4,463,363, 4,254,424, 4,538,163, 4,409,604, 4,408,214, 4,365,549, 4,267,556, 4,160,257, and U.S. Pat. No. 4,155,093, the disclosures of each of which are totally incorporated herein by reference.

The recording sheets of the present invention can be used in any other printing or imaging process, such as printing with pen plotters, handwriting with ink pens (either aqueous or nonaqueous based inks), offset printing processes, or the like, provided that the ink employed to form the image is compatible with the material selected as the ink receiving layer of the recording sheet.

The recording sheets of the present invention exhibit little or no blocking. Blocking refers to the transfer of ink or toner from a printed image from one sheet to another when recording sheets are stacked together. The recording sheets of the present invention exhibit substantially no blocking under, for example, environmental conditions of from about 20 to about 80 percent relative humidity and at temperatures of about 80° F.

Further, the recording sheets of the present invention exhibit high resistance to humidity. Resistance to humidity generally is the capacity of a recording sheet to control the blooming and bleeding of printed images, wherein blooming represents intra-diffusion of dyes and bleeding represents inter-diffusion of dyes. The blooming test can be performed by printing a bold filled letter such as "T" on a recording sheet and placing the sheet in a constant environment chamber preset for humidity and temperature. The vertical and horizontal spread of the dye in the letter "T" is monitored periodically under a microscope. Resistance to humidity limit is established when the dyes selected begin to diffuse out of the letter "T". The bleeding test is performed by printing a checker board square pattern of various different colors and measuring the inter-diffusion of colors as a function of humidity and temperature.

The optical density measurements recited herein were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE 1

Twenty transparent recording sheets were prepared by a solvent extrusion process (single side each time initially) on a Faustel Coater by providing a Mylar TM base sheet (roll form) with a thickness of 100 microns and coating the base sheet with a polyblend consisting of 25 percent by weight sodium carboxymethyl cellulose (CMC 7H3SX, obtained from Hercules Chemical Company), 50 percent by weight poly(ethylene oxide) (POLY OX-WSRN 3000, obtained from Union Carbide Chemicals), and 25 percent by weight acrylic latex (RHOPLEX B15J, obtained from Rhom and Haas Company). The polyblend was present in a concentration of 4 percent by weight in water. Subsequent to air drying at 100° C. for a period of 20 minutes and monitoring the difference in weight prior to and subsequent to coating, the dried Mylar® roll was coated on one side with the coating present in an amount such that when the roll was cut into twenty 8.5×11 inch sheets, each sheet was coated on one side with 0.7 grams, 7 microns in thickness of the polymer layer. Rewinding the coated side of the Mylar® on an empty core and using this roll, the uncoated back side of the Mylar® was coated with the coating material used on the front side by the same process. The roll was then cut into 20 8.5×11 inch sheets. These recording sheets were then fed individually into a Xerox® 4020 ink jet color printer containing four separate inks (commercially available and obtained from Sharp Inc. as inks for the Xerox® 4020) which each comprised water, glycols, and a black, magenta, cyan, or yellow dye, respectively. Images were obtained on the image receiving layers with average optical density values of ten of the sheets measured at 2.32 (black), 1.63 (magenta), 1.95 (cyan), and 1.06 (yellow). These imaged transparency sheets were placed in a heat and humidity controlled environment chamber preset at 80° F. and 80 percent relative humidity. The ink jet images under such conditions were resistant to humidity for more than a week in that they exhibited no blooming during this time. The other ten imaged sheets were kept in plastic sleeves composed of poly(propylene) and poly(vinyl chloride) for a period of one month, during which time they exhibited no blooming and there was no mildew development in the coating.

EXAMPLE II

Twenty transparent recording sheets were prepared by a solvent extrusion process (single side each time initially) on a Faustel Coater by providing a Mylar ® base sheet (roll form) with a thickness of 100 microns and coating the base sheet with a polyblend consisting of 25 percent by weight sodium carboxymethyl cellulose (CMC 7HOF, obtained from Hercules Chemical Company), 25 percent by weight poly(ethylene oxide) (POLY OX-WSRN 3000, obtained from Union Carbide Chemicals), 25 percent by weight hydroxypropylmethyl cellulose (HPMC K35LV, obtained from Dow Chemical Company) and 25 percent by weight acrylic latex (RHOPLEX B15J obtained from Rohm and Haas Company). The polyblend was present in a concentration of 5 percent by weight in water. Subsequent to air drying at 100° C. for a period of 20 minutes and monitoring the difference in weight prior to and subsequent to coating, the dried Mylar ® roll was coated on one side with the coating in an amount such that when the roll was cut into twenty 8.5×11 inch sheets, each sheet was coated on one side with 0.65 grams, 6.5 microns in thickness, of the polymer layer. Rewinding the coated side of the Mylar ® on an empty core and using this roll, the uncoated back side of the Mylar ® was coated with the coating materials used on the front side by the same process. Ten of these recording sheets were then fed individually into a Xerox ® 4020 ink jet printer. Images were obtained with average optical density values for the ten sheets of 2.08 (black), 1.34 (magenta), 1.63 (cyan), and 0.88 (yellow). These imaged transparencies were placed in a heat and humidity controlled environment chamber preset at 80° F. and 80 percent relative humidity. The ink jet images under these conditions were resistant to humidity for a period of more than a week in that they exhibited no blooming during this time. The other ten non-imaged sheets were kept in poly (propylene) plastic sleeves for a period of one month without developing any mildew in the coating layer.

EXAMPLE III

Twenty transparent recording sheets were prepared by a dip coating process (both sides coated in one operation) by providing Mylar ® base sheets in cut sheet form (8.5×11.0 inches) in a thickness of 100 microns and coating the base sheets with a polyblend consisting of 25 percent by weight hydroxyethyl cellulose (Natrosol 250LR, obtained from Hercules Chemical Company), 50 percent by weight poly(ethylene oxide) (POLY OX WSRN-3000, obtained from Union Carbide Chemicals), and 25 percent by weight sytrene-butadiene latex (76 RES 4100, obtained from Union Oil Chemicals). The polyblend was present in a concentration of 4 percent by weight in water. Subsequent to air drying at 100° C. for a period of 10 minutes and monitoring the difference in weight prior to and subsequent to coating, the dried Mylar ® sheets were each coated with 0.7 grams, 7 microns in thickness (each side) of the polyblend. These sheets were then fed individually into a Xerox ® 1038 black-only imaging apparatus and images were obtained with an average optical density value of 1.35 (black). These images could not be lifted off with a 3M Scotch ® tape 60 seconds subsequent to their preparation.

EXAMPLE IV

Twenty transparent recording sheets were prepared by a dip coating process (both sides coated in one operation) by providing Mylar ® base sheet in cut sheet form (8.5×11.0 inches) in a thickness of 100 microns and coating the base sheets with a polyblend consisting of 60 percent by weight xanthan gum (Keltrol-T, obtained from Kelco division of Merck and Company), 30 percent by weight ethylene oxide-propylene oxide block copolymer (Tetronic 50R8, obtained from BASF Corporation), and 10 percent by weight carboxylated vinyl acetate homopolymer latex (Synthemul synthetic resin 40-502, obtained from Reichhold Inc.) The polyblend was present in a concentration of 4 percent by weight in water. Subsequent to air drying at 100° C. for a period of 10 minutes and monitoring the weight prior to and subsequent to coating, the dried Mylar ® sheets were each coated with 0.8 grams, 8 microns in thickness (each side) of the polyblend. These sheets were then fed individually into a Xerox ® 1005 color imaging apparatus and images were obtained with optical density values of 1.6 (black), 1.35 (magenta), 1.5 (cyan), and 0.8 (yellow). These images could not be lifted off with 3M Scotch ® tape 60 seconds subsequent to their preparation.

EXAMPLE V

Twenty transparent recording sheets were prepared by a dip coating process (both sides coated in one operation) by providing Mylar ® base sheet in cut sheet form (8.5×11.0 inches) in a thickness of 100 microns and coating the base sheet with a polyblend consisting of 40 percent by weight hydroxypropyl methyl cellulose (Methocel K35LV, obtained from DOW Chemical Company), 20 percent by weight poly(ethylene oxide) (POLY OX-WSRN 3000, obtained from Union Carbide Chemicals), 20 percent by weight sodium carboxymethyl cellulose (CMC 7HOF, obtained from Hercules Chemical Company), and 20 percent by wight ethylene-vinyl acetate latex (AIRFLEX, obtained from Air Products and Chemicals). The polyblend was present in a concentration of 4 percent by weight in water. Subsequent to air drying at 100° C. for a period of 10 minutes and monitoring the weight prior to and subsequent to coating, the dried Mylar ® sheets were coated with 0.7 grams, 7 microns in thickness (each side) of the polyblend. These sheets were then fed individually into a Xerox ® 4020 color ink jet printer and images were obtained with optical density values of 1.70 (black), 1.20 (magenta), 1.10 (cyan), and 0.75 (yellow). Ten of these imaged transparency sheets were placed in a heat and humidity controlled environment chamber present at 80° F. and 80 percent relative humidity. The ink jet images under such conditions were resistant to humidity for more than a week in that they exhibited no blooming during this time. The ten other imaged transparency sheets were kept in plastic sleeves composed of poly(vinyl chloride) and poly (propylene) for a period of one month, during which time they exhibited no blooming and there was no mildew development in the coating layer.

COMPARATIVE EXAMPLE A

Twenty coated transparency recording sheets were prepared by a dip coating process (both sides coated) in one operation by providing a Mylar ® base sheet in cut sheet form (8.5×11 inches) in a thickness of 100 microns and coating the base sheet with an ink receiving layer as disclosed in U.S. Pat. No. 4,592,954, the disclosure of which is totally incorporated herein by reference, comprising a blend of 40 percent by weight sodium carboxymethyl cellulose (CMC 7HOF, obtained from Hercules Chemical Company) and 60 percent by weight poly (ethylene oxide) (POLY OX WSRN-3000, obtained from Union Carbide Chemicals), which solution was present in a concentration of 4 percent by weight in water. Subsequent to air drying at 100° C. for a period of 20 minutes and monitoring the difference in weight prior to and subsequent to coating, the dried Mylar® sheets were each coated with 0.7 grams, 7 microns in thickness (each side) of the polyblend.

These recording sheets were then fed individually into a Xerox® 4020 ink jet color printer containing four separate inks (commercially available and obtained from Sharp Inc. as inks for the Xerox® 4020) which each comprised water, glycols, and a black, magenta, cyan, or yellow dye, respectively. Images were obtained on the image receiving layers with average optical density values of ten of the sheets measured at 1.85 (black), 1.55 (magenta), 1.70 (cyan), and 1.45 (yellow). These imaged transparency sheets were placed in a heat and humidity controlled environment chamber preset at 80° F. and 80 percent relative humidity. The ink jet images under such conditions were only resistant to humidity for 24 hours and after that they exhibited blooming. The other ten imaged sheets were kept in plastic sleeves composed of poly(propylene) and poly (vinyl chloride) for a period of one month, during which time they exhibited blooming and there was mildew development in the coating. In contrast, there was no blooming or mildew development in the recording sheets of Example I, Example II, or Example V, which were coated with the materials of the present invention and imaged in an ink jet printing process.

COMPARATIVE EXAMPLE B

Twenty coated transparency recording sheets were prepared by a dip coating process (both sides coated in one operation) by providing a Mylar® base sheet in cut sheet form (8.5×11 inches) in a thickness of 100 microns and coating the base sheet with an ink receiving layer as disclosed in U.S. Pat. No. 4,865,914, the disclosure of which is totally incorporated herein by reference, comprising a blend of 45 percent by weight sodium carboxymethyl cellulose (CMC 7HOF, obtained from Hercules Chemical Company), 45 percent by weight poly (ethylene oxide) (POLY OX WSRN-3000, obtained from Union Carbide Chemicals), and 10 percent by weight hydroxypropyl cellulose (KLUCEL E, obtained from Hercules Chemical Company), which solution was present in a concentration of 4 percent by weight in water. Subsequent to air drying at 100° C. for a period of 20 minutes and monitoring the difference in weight prior to and subsequent to coating, the dried Mylar® sheets were each coated with 0.7 grams, 7 microns in thickness (each side) of the poly blend. These recording sheets were then fed individually into a Xerox® 4020 ink jet color printer containing four separate inks (commercially available and obtained from Sharp Inc. as inks for the Xerox® 4020) which each comprised water, glycols, and a black, magenta, cyan, or yellow dye, respectively. Images were obtained on the image receiving layers with average optical density values of ten of the sheets measured at 1.05 (black), 1.35 (magenta), 1.03 (cyan), and 0.62 (yellow). These imaged transparency sheets were placed in a heat and humidity controlled environment chamber preset at 80° F. and 80 percent relative humidity. The ink jet images under such conditions were only resistant to humidy for 24 hours, and after that they exhibited blooming. The other ten imaged sheets were kept in plastic sleeves composed of poly(propylene) and poly (vinyl chloride) for a period of one month, during which time they exhibited blooming and there was mildew development in the coating. In contrast, there was no blooming or mildew development in recording sheets of Example I, Example II, or Example V, which were coated with the materials of the present invention and imaged with an ink jet printing process.

Other embodiments and modifications of the present invention may occur to those skilled in the art subsequent to a review of the information presented herein; these embodiments and modifications, as well as equivalents thereof, are also included within the scope of this invention.

What is claimed is:

1. A recording sheet which comprises a substrate and an image receiving layer consisting essentially of a mixture of (a) a polymer capable of forming a latex and selected from the group consisting of (i) poly (vinyl chloride), (ii) ethylene-vinyl chloride copolymers, (iii) poly (vinyl acetate), (iv) carboxylated poly (vinyl acetate), (v) ethylene-vinyl acetate copolymers, (vi) polymers containing acrylate monomers, (vii) poly styrene, (viii) styrenebutadiene copolymers, (ix) carboxylated styrene-butadiene copolymers, (x) butadiene-acrylonitrile copolymers, (xi) butadiene-acrylonitrile-styrene copolymers, and (xii) mixtures thereof; (b) a polysaccharide; and (c) a polymer containing oxyalkylene monomers.

2. A recording sheet according to claim 1 wherein the image receiving layer is present in a thickness of from about 1 to about 25 microns.

3. A recording sheet according to claim 1 wherein the image receiving layer contains the latex-forming polymer in an amount of from about 5 to about 95 percent by weight, the polysaccharide in an amount of from about 2 to about 60 percent by weight, and the oxyalkylene-containing polymer in an amount of from about 3 to about 60 percent by weight.

4. A recording sheet according to claim 1 wherein the image receiving layer contains a filler material.

5. A recording sheet according to claim 1 wherein the polysaccharide is selected from the group consisting of cellulose ester salts, cellulose ethers, cellulose ether salts, cationic cellulose ethers, hydroxyalkyl celluloses, substituted deoxycelluloses, dextran polymers, natural ionic gums, protein polymers, n-carboxymethyl amylose salts, and mixtures thereof.

6. A recording sheet according to claim 1 wherein the oxyalkylene-containing polymer is selected from the group consisting of poly (oxy methylene), poly (oxyethylene), poly (propylene oxide), poly (1,4-oxy butylene) glycol, ethylene oxide/propylene oxide copolymers, tetrafunctional block copolymers derived from the sequential addition of ethylene oxide and propylene oxide to ethylene diamine, ethylene oxide/2-hdyroxyethyl methacrylate/ethylene oxide triblock copolymers, ethylene oxide/hydroxypropyl methacrylate/ethylene oxide triblock copolymers, ethylene oxide/4-vinyl pyridine/ethylene oxide triblock copolymers, ionene/ethylene oxide/ionene triblock copolymers, ethylene oxide/isoprene/ethylene oxide triblock copolymers, and mixtures thereof.

7. A recording sheet according to claim 1 wherein the image receiving layer is coated onto both surfaces of the substrate.

8. A recording sheet according to claim 1 wherein the substrate is substantially transparent.

* * * * *